April 30, 1935. C. A. ROGERS ET AL 1,999,980

FIFTH WHEEL

Filed July 2, 1930 4 Sheets-Sheet 2

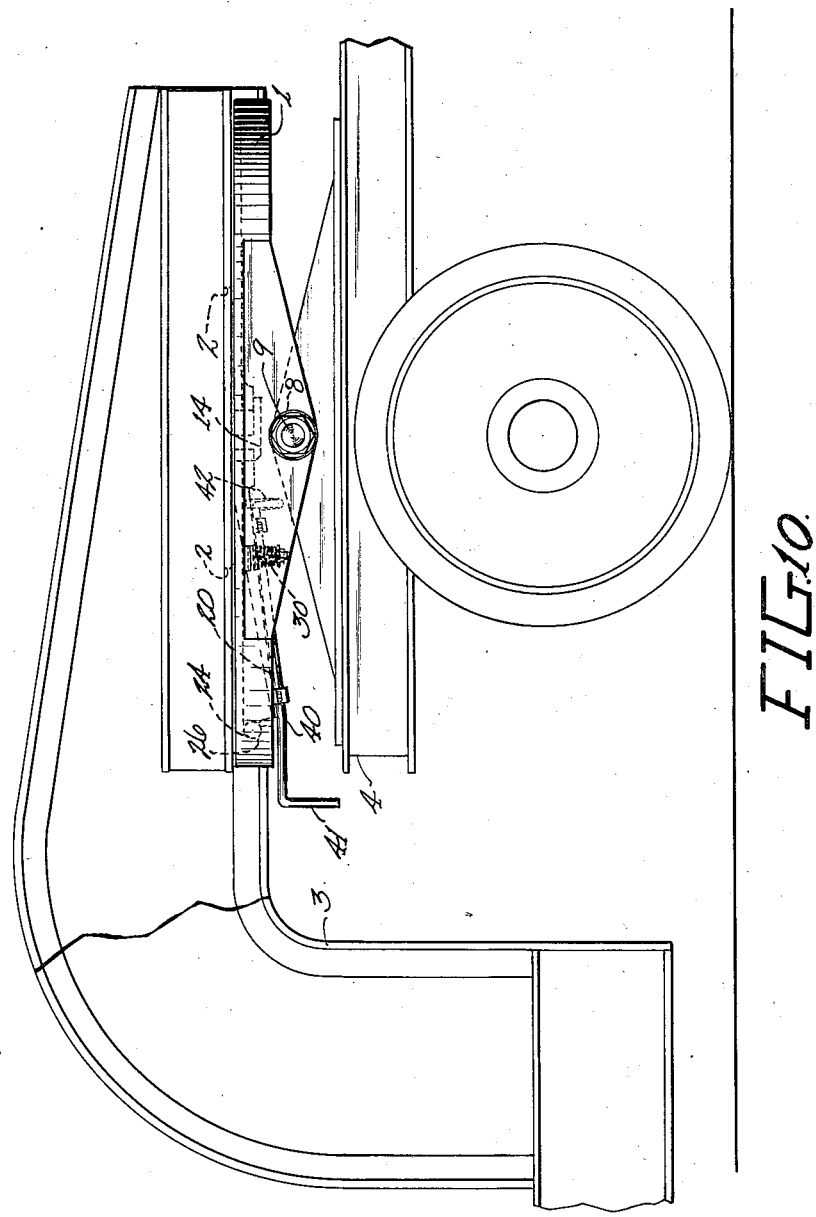

Patented Apr. 30, 1935

1,999,980

UNITED STATES PATENT OFFICE 1,999,980

FIFTH WHEEL

Charles A. Rogers, Louis J. Rogers, and Hugh L. Rogers, Albion, Pa., assignors to Rogers Brothers Corporation, Albion, Pa., a corporation of Pennsylvania Application July 2, 1930, Serial No. 465,332

21 Claims. (Cl. 280—33.1)

This invention relates to load carrying vehicles adapted for carrying very large loads, for instance, a hundred tons or more, and is particularly concerned with a means for coupling such vehicles together so as to form a train.

In vehicles of this class the end of each vehicle is usually supported on the rear of the vehicle preceding it in the train and pivotally connected thereto. This arrangement permits the vehicles to be swung about the coupling so that they may negotiate short turns and may be placed at abrupt angles to each other for convenience in loading and unloading. It is very desirable that the load carrying floors of such vehicles be kept in their horizontal position as the vehicles are so turned and as they are connected and disconnected, since a slight tilting of the body under extremely large loads may shift the load or redistribute the stresses in such manner that it will damage the vehicles or overturn the load.

With these factors in mind, it is one of the objects of our invention to provide a coupling for heavy duty vehicles which is capable of supporting comparatively large portions of the load and at the same time permit relative pivoting of the vehicles about the coupling, so that they may be placed at very abrupt angles to each other without danger of tilting.

Another object of our invention is a coupling which may be interlocked by the movement of said vehicles relatively together while the load carrying floors are retained in their normal horizontal positions.

A more specific object resides in the means for uncoupling the vehicles, which permits them to be disconnected while the load is still supported by the coupling, and which requires for its operation only the movement of one vehicle away from the other in a horizontal plane.

Still another object resides in providing a coupling of this nature, which lends itself to economic manufacture and ease of adaptation for use with any truck and trailer without material changes therein.

Further objects and advantages will become apparent from the following specification wherein reference is made to the drawings by the use of numerals.

In the drawings Fig. 1 shows a preferred form of our coupling connecting a heavy duty trailer to a truck.

Fig. 10 illustrates another manner of using our invention.

Figure 1:
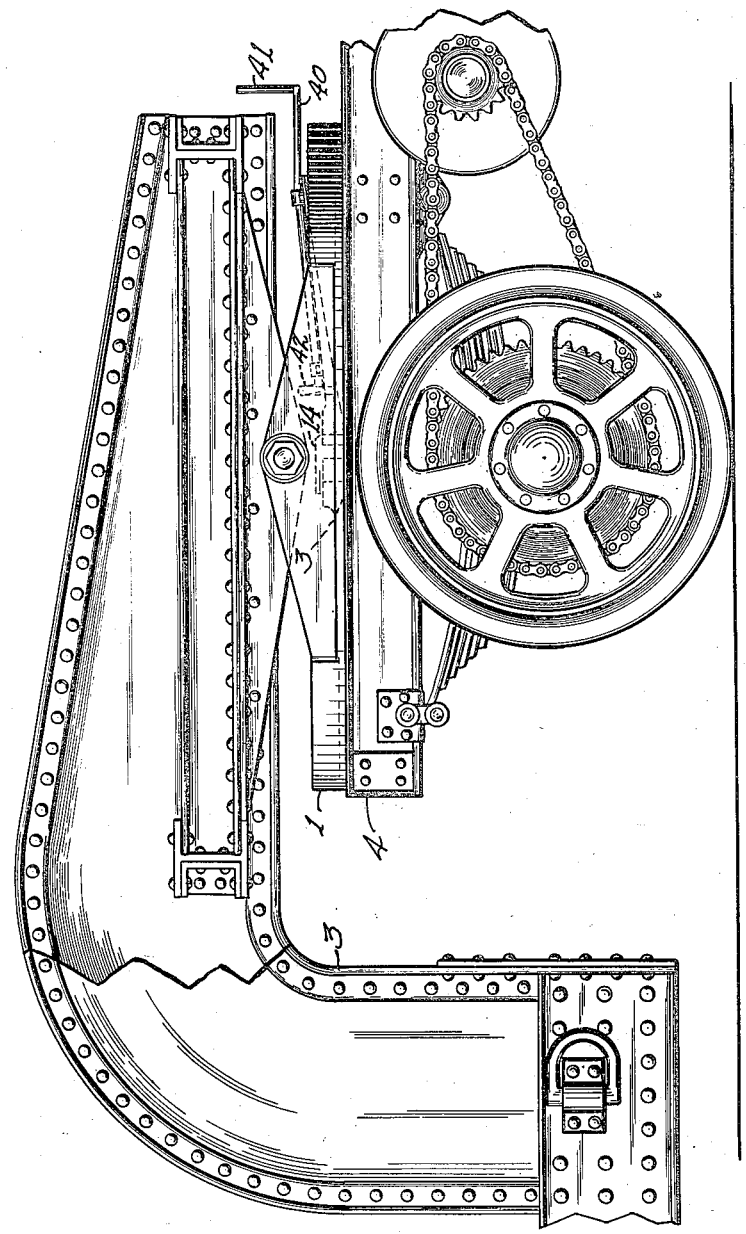
Figure 4:
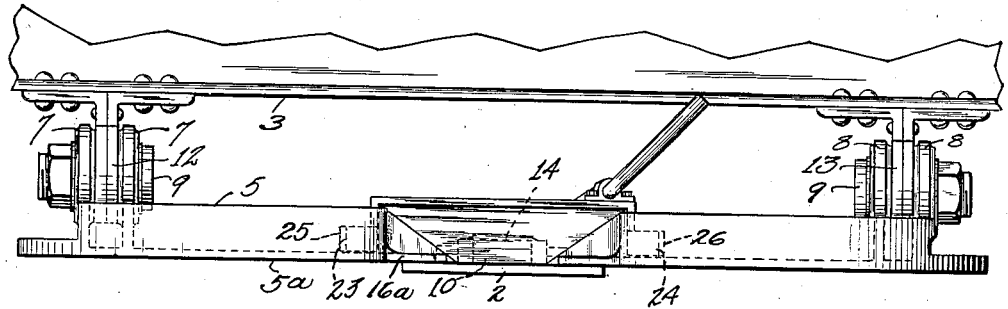
Fig. 4 is an end elevation of the coupling shown in Fig. 2, showing a vehicle body attached thereto.
Figure 5:
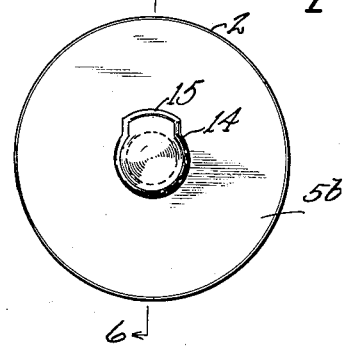
Fig. 5 is a plan view of another one of the coupling elements of our invention.
Figure 6:
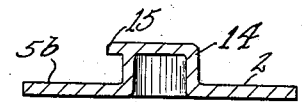
Fig. 6 is a sectional view taken on a plane indicated by the line 6—6 in Fig. 5.
Figure 7:
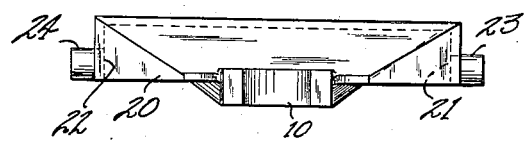
Fig. 7 is an end elevation of one of the coupling elements shown in Fig. 2.
Figure 8:
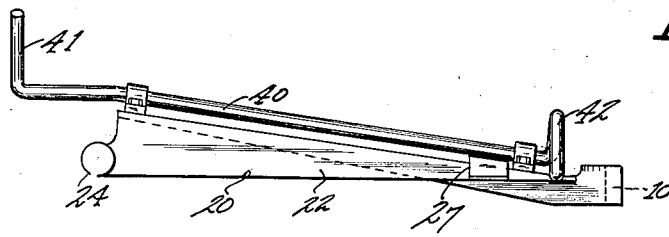
Figs. 8 and 9 are side elevations of the coupling element shown in Fig. 7, illustrating the operation of the release mechanism.
Figure 9:
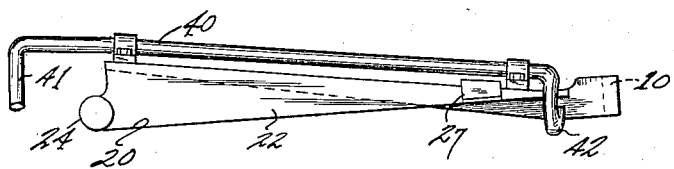

Our invention, a preferred form of which is illustrated in the drawings, includes a bearing member 1 which may be secured to a trailer or other vehicle 3, as better illustrated in Figs. 4 and 6 and adapted to engage a complementary bearing member 2 on a truck or other vehicle 4. The bearing member 1 comprises a bearing plate which, for economy, may be in the form of a circular plate reinforced about its circumference by an annular flange 5, and having a smooth bearing surface 5a adapted to engage a complementary bearing surface 5b on a bearing plate 2. As illustrated, the bearing member 1 is secured to the trailer 3, as illustrated in Fig. 1, or to the truck 4 as illustrated in Fig. 10 by means of a suitable shackle connection. This shackle connection may be conveniently formed by sets of bearing members 7 and 8, spaced apart to form yokes adapted to receive cooperating tongues 12 and 13 on the trailer, which may be secured in position by bearing pins such as indicated at 9. This connection between the truck and trailer directs all stresses in a direction normal to the bearing surfaces of the plates 1 and 2 and to the axis of the pin 14 later described, thus eliminating any stresses tending to cause relative tipping of plates 1 and 2. Further, this connection causes the stresses to be evenly distributed over the bearing surfaces, effecting further economies in construction and repair.

The bearing plate 1 is also provided with a central opening 10, reinforced by an annular shoulder 11. This plate may be reinforced additionally with ribs such as 12a and 13a.

The complementary bearing plate 2 is rigid with one of the vehicles and is provided with a projecting lug or pin 14 conveniently formed integral with the plate 2, as illustrated, for pivotally connecting the vehicles. This pin has an extending nib 15, the function of which will later be described. In order that the pin 14 may be positioned in the opening 10 so as to pivotally connect the vehicles, we provide a radial passage 16 in the bearing member 1 extending from the outer circumference through the shoulder 11, so as to communicate with the central opening 10.

This passage is preferably in the form of a circular sector, being much wider at the circumference of the plate 1 than the central opening and converging toward the center. By this arrangement the connecting pin 14 may be moved into position in the opening 10 while the bearing members 1 and 2 are in contact and supporting the load of the vehicle by merely rolling the vehicles relatively together. The walls 16a of the radial passage 16 act as a guide to direct the pin 14 into the opening 10.

Figure 3:
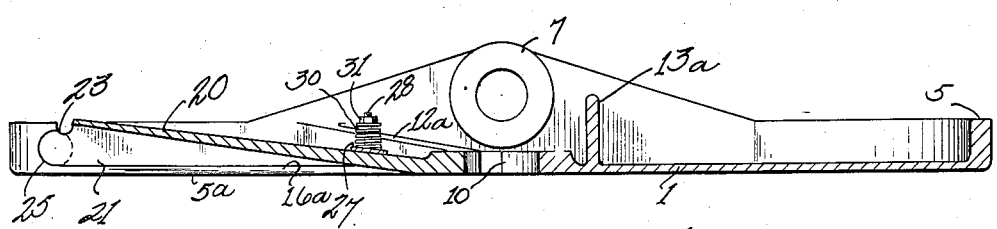
Fig. 3 is a sectional view taken on a plane indicated by the line 3—3 of Fig. 2.

In order to lock the pin into position within the opening 10, we provide a closure plate 20 which may be channel-like in form having downwardly extending side walls 21 and 22 convergent toward the opening 10 and provided with bearing lugs 23 and 24 adapted to engage complementary bearing recesses 25 and 26 in the annular flange 5 of the bearing member 1. The depth of the channel portion decreases from the circumference of the plate 1 inwardly towards the central opening 10 as more clearly illustrated in Fig. 3, a portion of the under surface of the plate adjacent to the opening 10 lying in the plane of the bearing surface of the plate 1. In order to retain the plate in position, it may be provided with a strap or band 27, rigid therewith and having openings adapted to receive bolts such as 28 and 29 rigid with the bearing member 1.

Resilient means such as springs 30 are provided between the band 27 and the nuts 31 and 32 on the bolts 28 and 29. This arrangement permits the plate to pivot about the bearing lugs 23 and 24, while retaining it in proper alignment for seating, to normally close the side wall of the opening 10. Obviously, as the vehicles are moved relatively together, the pin 14 may be easily directed into the wide radial passage and will engage the underside of the plate 20. As the movement of the vehicles together continues, the pin 14 lifts the plate 20, compressing the springs 30 and is guided radially into the central opening 10 by the walls 16a of the radial passage 16 in the plate 1, while the bearing members are in operating contact.

As soon as the pin 14 has passed into the opening 10, it passes from under the plate 20, releasing the same, and the springs force the plate downwardly in normal seating position behind the pin. In this manner the pin is locked firmly within the central opening 10 and the vehicles are coupled.

In order to provide a circular bearing seat for the pin 14, the closing or removable wall section of the opening 10 carried on the plate 20 may be of the same radius as the opening 10 and concentric with the opening when the plate 20 is seated for locking the pin in the opening 10. Thus the walls of the opening 10 are formed in separated sections, the section carried on the plate 20 being movable vertically relative to the other section of the wall.

When it is desired to uncouple the vehicles the plate 20 may be raised, thus permitting passage of the pin 14 out from the opening 10. To raise the plate 20 a simple and effective cam lever 40 may be secured on the plate 20 and adapted to be rotated about its axis by means of the handle 41. The other end of the lever is bent outwardly and around to form a cam 42, which engages the surface of the plate 1. By turning the lever, a camming action between the plate 1 and the plate 20 results, which lifts the plate a sufficient height to permit relative passage of the pin 14 and plate. Since in some cases there may be a tendency for the members to lift relatively apart, normal to the bearing surfaces or axially of the pin, the pin 14 is provided with the extending nib 15 above described, so that when it is seated in the opening 10, the nib lies over a portion of the annular shoulder 11, thus locking the annular shoulder between the plate 2 and the nib 15.

It should be noted that by this arrangement, the bearing surfaces of the plates 1 and 2 are in contact, both before and after the pin engages the central opening and during the connecting operation and support the trailer with its floor in a horizontal position.

It is desirable that the closure plate 20 be locked in place after the pin 14 has been placed in position within the opening 10 so that the trailer and truck will not become uncoupled during operation.

Figure 2:
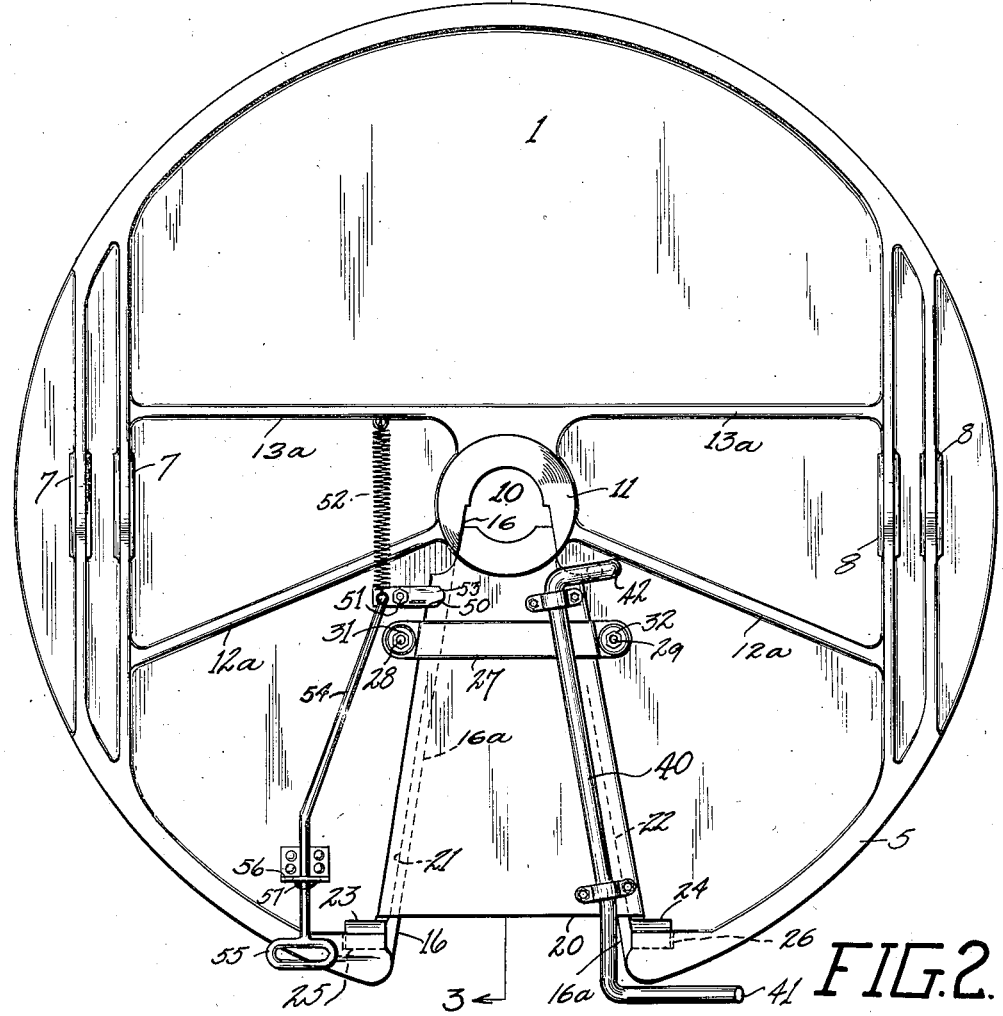
Fig. 2 is a plan view of one of the coupling elements of our invention.

A simple and effective lock is illustrated in Fig. 2, and includes a lug 50 pivotally mounted on a pin 51 which is secured on the fifth wheel. By means of a spring 52 the lug is normally held so that a projecting portion 53 extends over and engages a portion of the upper surface of the plate 20. In such position it locks the plate in place. In order to turn the lug 50 out of engagement with the plate 20 so that the plate may be raised for connecting and disconnecting the pin 14 from the opening 10 of the fifth wheel, a rod 54, having a handle 55, is pivotally secured to the lug 50. The rod passes through an opening in a supporting bracket 56 which may be mounted on the fifth wheel.

In the form of lock illustrated, the rod 54 is pulled axially outward from the fifth wheel to turn the lug 50 so that the projecting portion 53 is moved off from the plate 20 to release the plate. This action places the spring 52 under tension. A nib 57 is provided on the underside of the rod and is so positioned that it may engage the outside face of the bracket 56 when the lug is turned out of engagement with the plate 20. This retains the lug in open position so that the plate 20 may be operated as described. As soon as the connection is made, the lug 50 is released by releasing the rod 54 and the spring 52 draws it into locking position over the plate 20.

The lock has been omitted from the remaining figures for the purpose of clearness in illustration.

In some cases it is very desirable to use a single truck in connection with a large number of trailers, that is, a loaded trailer may be delivered to some one location, and while it is being unloaded, the truck used to move other trailers about. By the arrangement illustrated in Fig. 1, this would necessitate a duplication of the member 1 for each trailer, and would be relatively expensive. In such cases, it may be desirable to reverse the parts, as shown in Fig. 10, carrying the less expensive bearing plate 2 on the trailer and the bearing plate 1 on the motor vehicle. Thus the less expensive of the two members is duplicated and a great saving in cost effected.

While we have illustrated our invention by showing its use for coupling the trailer and a motor vehicle, obviously it could be used to connect a large number of trailers or other vehicles in a train. Again, in some of the larger trailers, we find it desirable to provide a front wheel assemblage for carrying a portion of the trailer load rather than to carry it on the truck. In such cases, the connection here described is equally effective, and, in the appended claims, the word "vehicle" is meant to include such front wheel assemblages.

It is apparent also that we have provided a wide strong bearing surface permitting easy pivotal movement between the vehicles. Furthermore, by making the member 1 of large diameter to span a considerable portion of the body of the vehicle with which it is associated, the two vehicles may be pivoted at any angle to each other without danger of tipping one or the other, as a slight tipping action would immediately be counteracted by the bearing surfaces and excessive tipping action by engagement of the plate 1 and the truck or other vehicle.

Obviously it is not necessary that the central opening 10 be placed within the area of the bearing member 1, although we prefer to do it in this manner. For instance, if located in front of the bearing member 1, a locking device embodying the principles of our invention could be used with very effective results.

It is to be understood, therefore, that "central opening" and "radial opening" as used in the specification and claims is not descriptive of the location of these openings, but is to distinguish one from the other, "central opening" meaning the opening which receives the king pin, and "radial opening" designating the opening connecting therewith.

We claim:

1. The combination with two connected vehicles of a fifth wheel, including a bearing member on one of said vehicles, a complementary bearing member on the other of said vehicles, one of said vehicles having an opening, a lug on the other of said vehicles adapted to engage said opening, means forming part of the wall of said opening, said means being movable in an arcuate path in a vertical plane to one position for permitting said lug to engage said opening and returnable to its original position to retain said lug in said opening.

2. The combination with two vehicles of a fifth wheel, comprising a bearing plate and a lug on one of said vehicles, a complementary bearing member on the other of said vehicles having a central opening therein adapted to engage said lug, a radial passage connecting with said central opening, and means to obstruct said passage after said lug has moved into said opening, said means comprising a closure plate carried by said vehicle having the latter bearing member and said means being rotatable about an axis disposed at an angle to the axis of said opening.

3. The combination with two vehicles of a fifth wheel connection, comprising complementary bearing members on the respective vehicles, a king pin carried by one of said vehicles, one of said members having an opening adapted to receive said pin radially, means movable substantially parallel to the axis of said pin and cooperating with the opening to substantially enclose the pin whereby said pin is held in connecting engagement.

4. The combination with two vehicles of a fifth wheel construction, comprising complementary bearing members on the vehicles, a king pin on one of said vehicles, means on the other vehicle having an opening, the walls of which are formed in separated sections, one of said sections being movable away from and toward the plane of the bearing surfaces when said surfaces are in bearing contact to permit radial entrance of said pin into said opening in the first position, and to lock said pin in said opening in the last mentioned position.

5. The combination with two vehicles, of a fifth wheel comprising complementary bearing members on separate vehicles and a king pin on one of said vehicles, the bearing member on the other vehicle having an opening, the walls of the opening being formed in separated sections, one of said sections being movable away from the plane of the bearing surface of said bearing member to permit radial entrance of said pin into said opening and returnable to the original position to lock said pin in said opening, the movable section being operated by said pin when moving radially toward said opening, and other means to move the movable sections for disconnecting said pin and bearing member while said bearing members are in supporting relation.

6. A fifth wheel construction, comprising complementary bearing members and a king pin for interlocking said members, one of said bearing members having a radial passage therein and a communicating central opening adapted to receive said pin, a plate pivoted normal to the axis of said pin and lying over said radial passage, one end of said plate forming a portion of the walls of said central opening, means to rotate said plate away from said bearing member for permitting passage of said pin through said radial passage to said central opening, and means to return said plate to its normal position after said pin is within said central opening, whereby said pin is locked within said opening.

7. The combination with two vehicles of a fifth wheel construction comprising complementary bearing surfaces on each of said vehicles for supporting one upon the other, a pivot pin on one of said vehicles, an annular band on the other of said vehicles adapted to receive said pivot pin while said bearing surfaces are in contact, a portion of the wall of said band being movable relative to other portions to permit insertion of said pin into said opening by movement thereof normal to its axis, means to guide said pin into said opening when said wall portion is removed, and means to return said wall portion to its normal position whereby said pin is locked within said annular band and the vehicles are pivotally connected.

8. The combination with two vehicles of a fifth wheel construction, comprising complementary bearing surfaces on each of said vehicles for supporting one upon the other, a pivot pin on one of said vehicles, an annular band on the other of said vehicles having an opening adapted to receive said pivot pin while said bearing surfaces are in contact, a portion of the wall of said band being movable relative to other portions to permit insertion of said pin into said opening by movement thereof normal to its axis, means to guide said pin into said opening when said wall portion is removed, means to return said wall portion to its normal position whereby said pin is locked within said annular band and the vehicles are pivotally connected, and means operable consequent upon the positioning of said pin within said band for retaining said bearing surfaces in contact relation.

9. A fifth wheel connection for vehicles including two bearing members, a pin on one of said members adapted to engage an opening in the other of said members for pivotally connecting said members, a plate on said last mentioned member carrying part of the wall of said opening and normally seated to close said opening and movable by said pin as the pin moves radially toward the opening for unseating said wall portion of said opening whereby said pin may be inserted thereinto while said members are in bearing contact with each other, means to change the position of said plate for returning said opening to its original shape, means to lock said plate in said last mentioned position.

10. In combination with two vehicles, a coupling device pivotally connecting the vehicles to each other, and comprising a coupling member on one of the vehicles provided with an opening and a passageway leading therefrom, and a co-operating coupling pin on the other of said vehicles, arranged to travel in said passage to seat in said opening, and a latching element swingable about an axis angularly disposed to the axis of the pin and normally blocking said passage, said element having a pin engaging surface to lock the pin in seated position and to release said pin respectively, said element being rotatable about said axis to displace said surface from the plane of the opening when the pin moves in said passageway toward the opening.

11. The combination with two vehicles, of a fifth wheel construction comprising complementary bearing surfaces on each of said vehicles for supporting one upon the other, a pivot pin on one of said vehicles, an annular band on the other of said vehicles having a central opening adapted to receive said pivot pin, portions of the wall of said band being movable by said pin relative to other portions to permit radial insertion of said pin into said opening, the returning of said wall portions to other positions completely locking the pin within the opening of said annular band.

12. The combination with two vehicles of a fifth wheel, comprising cooperating bearing plates respective to said vehicles, a lug in fixed relation to one of said plates, means associated with the other plate having an opening adapted to engage said lug and a passage connecting with said opening, and vertically movable means normally seated to occupy a portion of said passage and adapted to be displaced when the lug moves in said passage toward said opening, said vertical movable means being returnable to seated position for obstructing said passage after the lug has moved into said opening.

13. In a vehicle coupling mechanism, a vehicle to be moved and a vehicle adapted to support part of the load in the first mentioned vehicle and also adapted to be coupled with and detached from the former, bearing plates on each of the vehicles in bearing contact with each other, an opening in one of the vehicles, a pin on the other vehicle means associated with the opening and engageable with the pin and movable vertically of the bearing surfaces of said members while the bearing surfaces are in contact for connecting said vehicles through the medium of the pin.

14. The combination with two vehicles of a fifth wheel, comprising a bearing member and a lug on one of said vehicles, complementary bearing means on the other of said vehicles having a central opening associated therewith adapted to engage said lug, and a radial passage connecting with said central opening, and adapted to guide the lug into the central opening when the lug is moved toward the central opening therein, a member on the last mentioned vehicle movable toward and away from the plane of the bearing surface of said bearing means and obstructing the radial passage in one position along the path of movement of said member, whereby the lug is retained in the central opening, means to remove said member to another position in said path whereby the member is removed from the passage and the lug may be moved out from the central opening.

15. The combination with two vehicles, of a fifth wheel, comprising a bearing member and a lug on one of said vehicles, complementary bearing means on the other of said vehicles, a central opening associated therewith adapted to receive said lug, a radial passage connecting with the central opening and vertically movable means normally obstructing the passage and adapted to be displaced by said lug when the lug moves in said passage toward said opening and to return and engage the lug after the lug has moved into said opening.

16. The combination with two vehicles, of a fifth wheel connection comprising complementary relatively rotatable bearing members on the respective vehicles adapted to be placed into face to face bearing engagement with each other, means on one of the vehicles for guiding the bearing member of the other vehicle into operating position with respect to its complementary bearing member consequent upon movement of the vehicles together and while said members are in face to face contact, a latch means movable in a vertical plane and being displaceable consequent upon said movement of the members together to permit such movement into operating position, said latch means returning to its original position after the members have been moved into operating position with respect to each other for latching said members in said position, and means to retain said latching means in the latching position.

17. The combination with two connected vehicles of a fifth wheel, including a bearing member on one of said vehicles, a complementary bearing member on the other of said vehicles, one of said vehicles having an opening, one part of the wall of said opening being in fixed relation to the vehicle, an upright pin on the other of said vehicles adapted to engage said opening radially, means forming another part of the wall of said opening, said means being movable in an arcuate path in a vertical plane to one position for permitting said pin to pass radially into said opening while the members are in bearing contact and returnable to its original position to retain said pin in said opening.

18. In combination with two vehicles, a coupling device pivotally connecting the vehicles to each other, and comprising a coupling member on one of the vehicles provided with an opening and a passageway leading therefrom, the walls of said passage and opening being substantially continuous and in rigidly fixed relation with respect to each other, and a cooperating upright coupling pin on the other of said vehicles, arranged to travel radially in said passage to seat in said opening, and a latching element swingable about an axis angularly disposed to the axis of the pin and normally blocking said passage, said element having a pin engaging surface to lock the pin in seated position, and to release said pin respectively, said element being rotatable about said axis to displace said surface from the plane of the opening when the pin moves in said passageway toward the opening.

19. The combination with two vehicles of a fifth wheel, comprising cooperating bearing plates respective to said vehicles, an upright pin in fixed relation to one of said plates, means associated with the other plate having an opening adapted to engage said pin and a passage connecting with said opening, the walls defining said opening and passage being in fixed relation to each other and to the bearing plate with which associated, and vertically movable means normally seated to occupy a portion of said passage and adapted to be displaced when the pin moves in said passage toward said opening, said vertical movable means being returnable to seated position for obstructing said passage after the pin has moved into said opening.

20. The combination with two vehicles of a fifth wheel, comprising a bearing member and an upright pin on one of said vehicles, complementary bearing means on the other of said vehicles having a central opening associated therewith adapted to receive the pin, and a radial passage connecting with said central opening, and adapted to guide the pin into the central opening when the pin is moved toward the central opening therein, a member on the last mentioned vehicle normally disposed within said passage movable toward and away from the plane of the bearing surface of said bearing means and obstructing the radial passage in one position along the path of movement of said member, whereby the pin is retained in the central opening, means to remove said member to another position in said path whereby the member is removed from the passage and the pin may be moved out from the central opening.

21. A fifth wheel for connecting two vehicles comprising a plate adapted for connection to one vehicle adjacent one end thereof, a coupling element adapted for connection to the other vehicle adjacent the end thereof to be connected to the first vehicle, a connecting member carried by said element, a fixed socket member carried by said plate, side walls carried by the plate and connected at one end to the fixed socket member and diverging away from said fixed socket member for receiving the connecting member radially of the plate, a movable complementary socket member spaced from the fixed socket member in the direction of the divergence of said side walls and having a portion nearest the fixed socket member within said side walls when in operative position, said side walls acting to guide the connecting member into the socket when the movable socket member is in inoperative position, and means for locking said movable socket member in operative position within said side walls with said connecting member in the socket.

CHARLES A. ROGERS.
LOUIS J. ROGERS.
HUGH L. ROGERS.